3,242,120
SELF-SUPPORTING GEL SHAPED STRUCTURES

Walter Steuber, Springfield, Pa., assignor to E. I. du Pont de Nemours and Company, Wilmington, Del., a corporation of Delaware
No Drawing. Filed Mar. 22, 1960, Ser. No. 16,645
3 Claims. (Cl. 260—29.6)

This is a continuation-in-part of my copending application Serial No. 322,110, filed on November 22, 1952, now abandoned and my copending application Serial No. 491,208 filed February 28, 1955, now U.S. Patent No. 3,051,545 issued August 28, 1962.

This invention relates to a new and improved process for the preparation of shaped articles from water-insoluble polymers. More particularly, it pertains to the production of valuable filamentary materials from discrete particles of these polymers.

Three processes generally used in shaping articles from polymers are dry spinning, wet spinning and melt spinning. While these processes are used to advantage, it is desired to avoid certain deficiencies attending their use. The use of organic solvents in wet and dry spinning has the disadvantages of their cost, the expense of solvent removal and recovery and, frequently, chemical instability and toxicity. Melting of polymers for spinning frequently causes degradation of the polymer and certain effects that are difficult to control. Some organic polymers are soluble in concentrated aqueous solutions of certain salts. Many of the disadvantages of organic solvents would be obviated if shaped articles could be fabricated satisfactorily from these solutions. However, in most cases it is impossible to obtain a high concentration of polymer in the aqueous salt solutions without heating at elevated temperatures. This results in polymer degradation. Heating is usually necessary at some stage because of the extremely high viscosity which develops as the concentration of dissolved high molecular weight polymer increases. Decreasing polymer content or molecular weight to attain a viscosity sufficiently low for fabrication or desired control generally gives an inferior quality product and/or increased cost.

The elimination of dissolving or melting prior to shaping the polymer is highly desirable. A method for preparing shaped articles which would eliminate the usual steps of isolating and purifying the polymer prior to dissolving or melting would also be very desirable. For example, many polymers, particularly the vinyl type polymers, are made most readily in an aqueous medium in which the polymer is insoluble. Hitherto, the polymer was isolated from the dispersion and shaped into articles by means of a melt or a solution process. A method for preparing the shaped articles directly from the aqueous dispersion is a worthy objective.

An object of this invention is to provide a general process for the preparation of shaped articles from discrete particles of polymer dispersed in aqueous media. A further object is to provide a process for spinning fibers and casting films from water-insoluble polymers dispersed in an aqueous medium. Another object is to provide a means which facilitates the handling of freshly extruded shaped articles obtained from discrete particles of high polymers dispersed in aqueous media. Other objects are given hereinafter.

The objects of this invention are accomplished by providing a matrix which supports the freshly extruded article. The matrix-forming material is mixed with the water-insoluble, synthetic polymer particles dispersed in aqueous medium and is precipitated or gelled by extrusion into the setting medium, thereby immobilizing the polymer particles. These are then coalesced. The steps involved are: forming a spinning composition comprising a mixture of discrete particles of a water-insoluble, fiber-forming polymer in an aqueous medium having a minor proportion of a gellable matrix-forming material dissolved therein; shaping the resultant mixture by extruding it through an orifice into a setting medium; setting the shaped article comprising the substantially immobilized discrete polymer particles embedded in the matrix material; and coalescing or fusing the polymer particles in the presence of the matrix without destroying the shape of the extruded article. The shaped article will thus comprise a continuous phase of the fiber-forming polymer together with minor quantities of the matrix-forming material.

While most materials used to form the matrix or supporting structure are fiber-forming materials, it is not essential that they be initially fiber-forming. Materials which are not of themselves fiber-forming, but which upon extrusion into a setting medium are formed into fibers can be used. Generally, matrix-forming materials have molecular weights of 5,000 or more but this molecular weight may be developed in situ by cross-linking or polymerization reactions in the setting media. Those materials serving primarily as temporary supporting structures are referred to as "matrix-forming materials." The term "fiber-forming polymer" refers only to those polymers initially present in the aqueous medium as particulate solids and which are the major constituents of the ultimate shaped structure.

Contrary to known processes the process of this invention starts with discrete particles of polymer dispersed in an aqueous medium and does not involve the usual steps of dissolving or melting and resolidification in order to form the desired shape. Instead the shaped article is conveyed into a region where coalescence, rather than a coagulating or solidifying effect, is exerted on the polymer. This coalescing action is so regulated that it serves to fuse or coalesce the polymer particles. These features, in conjunction with the use of a matrix-forming material, define a process which is distinctly different from previous processes.

In the examples, which are given for illustrative purposes only and are not limitative, the parts are by weight and all processes were carried out at room temperature (about 25° C.) unless otherwise stated.

Example I

An aqueous dispersion of polyacrylonitrile was prepared from 0.10 parts potassium persulfate, 2.0 parts sodium lauryl sulfate, 120 parts of water and 80 parts of acrylonitrile. A stainless steel kettle was used, and the free space of the kettle was flushed with nitrogen gas and then sealed. After mixing the contents by relatively mild agitation for 16 to 17 hours at 40° C., the resulting polymer dispersion contained 36% solid material as determined by evaporation of a portion. The aqueous polymer dispersion was diluted with an equal volume of water containing 1% by weight of sodium alginate. The modified aqueous dispersion was extruded through a single-holed spinneret into a 70% by weight aqueous solution of zinc chloride containing 2% by weight of hydrochloric acid. The filament obtained coalesced in a few seconds and possessed suitable strength for handling. After removal from the bath, the filament was washed with water briefly and drawn 6 times its length on a plate heated to 130° C. A hard, non-rubbery fiber resulted.

Example II

A three-neck flask, equipped with a variable speed stirrer, a reflux condenser cooled with ice water and a nitrogen bleed, was immersed in a water bath maintained at 40° C. To this were added 120 parts of water containing 2 parts of sodium lauryl sulfate, 0.1 part potassium persulfate and .033 part sodium bisulfite. A rapid stream of nitrogen was bubbled through to remove oxygen completely from the flask and its contents. To the stirred aqueous medium was then added 80 parts of redistilled acrylonitrile. After an induction period of 2 minutes the reaction commenced, as indicated by the appearance of a blue opalescence in the aqueous layer. The reaction was allowed to proceed for 150 minutes. The product was a smooth, milky-white, fluid dispersion. By evaporation of a portion, the total solids content was found to be 39.2%. The intrinsic viscosity of a sample of the polymer, as measured in dimethylformamide, was found to be 7.8, which corresponds to a number average molecular weight of about 270,000. To the dispersion was added an equal volume of filtered aqueous solution containing 1% by weight of sodium alginate.

This dispersion was extruded through a monofil glass capillary spinneret of inside diameter of .015" into a bath consisting of 28% aqueous solution of calcium thiocyanate. The dispersion coagulated immediately into a white filament, which was continuously transferred from the bath to a second bath containing a 56% solution of calcium thiocyanate by means of a roll operating at a surface speed of 20 feet per minute. Within a few seconds after being immersed in the concentrated salt solution the fiber coalesced to a clear gel structure, which was removed from this bath after 3' of travel by another roll operating at a surface speed of 25 feet per minute, washed with water, and continuously wound on a bobbin.

When the acrylonitrile polymer dispersion was spun without modification with sodium alginate, the coagulated filament was too weak to be removed continuously from the coagulating bath by a simple driven roll.

*Example III*

The polymer dispersion of Example I was diluted with 3 times its volume of 1% aqueous sodium alginate and extruded through a 20-hole platinum spinneret, the diameter of each hole being .004", into a 2% aqueous solution of calcium thiocyanate. The precipitated filaments traveled 5 inches through the bath and then were passed over a nearly submersed weir into a bath of 58% aqueous calcium thiocyanate at 90° C. The filaments diverged readily and coalesced to a warp of gel filaments in 3' of travel. They were washed free from salt in a water bath at 0° C. Finally, the filaments were wound at the rate of 8.7 y.p.m. on a bobbin immersed in ice water. After being drawn 5× in boiling water, the yarn was 7.5 d.p.f. and had a tenacity of 4.1 g.p.d., an elongation at break of 13%, and an initial tensile modulus of 90.

*Example IV*

The modified polymer dispersion of Example I was extruded through a monofil glass capillary spinneret of diameter of .005" into a bath of 32% aqueous solution of calcium thiocyanate. The filament thus formed was removed from the bath after 3 inches of travel by a roll operating at a surface speed of 6.5 y.p.m. The filament then traveled through 24 inches of room temperature air. During travel through this zone, the filament coalesced and was wound on a bobbin immersed in 25° C. water. After this washing, the filament was drawn 7X over an electrically heated plate at 140° C. The final filament had a tenacity of 6.7 grams per denier, a break elongation of 9.4%, and an initial tensile modulus of 110 grams per denier, filament denier being 1.2.

*Example V*

The polymer dispersion of Example I was diluted with an equal volume of 1% sodium pectate and extruded through a 29 hole tantalum spinneret (hole diameter 0.003") into a bath of 5% aqueous solution of calcium thiocyanate. After a bath travel of 5 inches, the filaments were passed into a 58% aqueous calcium thiocyanate bath heated to 90° C. The filaments coalesced to a warp of rubbery gel filaments in 3 feet of travel. They were then passed into ice water and washed free from salt. They were wound on a bobbin immersed in ice water at the rate of 18.3 y.p.m. The filament bundle was drawn 5X in boiling water and then found to possess the following properties: denier=4.1 denier per filament, tenacity=4.2 grams per denier, elongation=13% and modulus=71.

*Example VI*

A fluid dispersion was prepared by stirring together 50 cc. of a N-methoxymethyl nylon dispersion and 50 cc. of a 1% solution of sodium alginate in water. The nylon dispersion contained 21% polymer, 1% of a branched-chain secondary alkyl sodium sulfate known as "Tergitol 7," 4.5% methanol and 73.5% water. The mixture was extruded through an orifice of .006" diameter into a water bath containing 2% calcium chloride. The gel structure formed was strong enough to be lifted up through a heated zone where it coalesced into a strong transparent filament.

*Example VII*

To 20 cc. of the N-methoxymethyl nylon dispersion described in Example VI was added 10 cc. of a 1.85% solution of sodium alginate. The mixture was extruded into an aqueous 3.7% solution of hydrochloric acid, and the resulting gel fiber was transferred into tetramethylurea at 50–70°. The fiber became translucent as a result of the coalescence of the polymer particles, and was transferred to warm water. This precipitated the solid nylon fiber and leached out the coalescing agent. The fiber was air-dried and could be drawn in steam. An aqueous 40% solution of sodium xylene sulfonate at 50–70° can also be used as a coalescing agent.

*Example VIII*

An aqueous dispersion was made from tetrafluoroethylene by the following procedure: 1500 grams distilled water, 1.5 grams disuccinic acid peroxide, 7.5 grams of sodium hexadecafluoronoanoate and 90 grams paraffin were placed in an autoclave which was evacuated, then heated to 80° and held at this temperature throughout the run. The pressure was raised to 400 p.s.i. by pumping in tetrafluoroethylene, and the pumping was continued to maintain this pressure until 1500 grams of tetrafluoroethylene was consumed.

The product, an aqueous dispersion of polytetrafluoroethylene, was mixed with a sodium alginate solution to give a weight composition of 27.0 polymer, 0.4% alginate, 0.2% paraffin and 72.4% water. This dispersion was extruded from a .004" hole into a water bath containing 2% calcium chloride. A firm gel filament resulted which was lifted through stream of hot air by a 6" wheel heated to 380° C. The gel sintered on this wheel to a strong, brown, cold-drawable continuous filament. The wheel surface speed was 50 feet per minute. The yarn was machine drawn at various ratios up to a maximum of 8.0× over a plate at 350° C. A sample, drawn 4×, had the following properties: tenacity=0.8 g.p.d., elongation=44% and denier=6.2.

*Example IX*

The following were stirred together to give a viscous fluid dispersion: 100 cc. 3% water solution of sodium alginate and 500 cc. of a polystyrene dispersion containing 48% polymer, 1% sodium lauryl sulfate and the remainder water.

The mixture was extruded through a circular orifice of .004" diameter into a water bath containing 5% calcium chloride. A gel structure immediately resulted which was continuously withdrawn and dried in air. The composition of the gel structure before drying was determined on a sample and found to be approximately 38% polymer, 59% water and 3% calcium chloride. The dried filament was drawn through a bath of high boiling aliphatic petroleum oil at 150° C. This converted the structure into a transparent and strong filament.

*Example X*

Ten cc. of an aqueous 1.85% solution of sodium alginate was added to 20 cc. of an aqueous dispersion containing 52% vinylidene chloride/acrylonitrile copolymer and 10% of dibutyl phthalate. The mixture was extruded into an aqueous 5% solution of calcium thiocyanate. The resulting gel fibers dried readily in air at room temperature to translucent fibers, susceptible to steam-drawing.

*Example XI*

An aqueous dispersion of polychlorotrifluoroethylene was mixed with an equal volume of a 1% aqueous solution of sodium alginate. The mixture was extruded through a 0.004″ hole into a 2% aqueous solution of calcium chloride. The resulting filament was lifted through a stream of hot air by means of a wheel heated to 275° C. The gel filament coalesced on this wheel to a strong filament.

*Example XII*

Polyvinyl alcohol solution (99% hydrolyzed, medium viscosity) was mixed with a dispersion of polyacrylonitrile to give a fluid dispersion containing 5.5% polyvinyl alcohol, 20.0% polyacrylonitrile and 74.5% water. This was extruded into a bath containing 0.5% sodium hydroxide, 1.0% boric acid and 98.5% water. Self-supporting filaments resulted in which polyvinyl alcohol served as the matrix. The filaments were coalesced in concentrated calcium thiocyanate. They were then washed and drawn over a plate at 165° C. to give a textile fiber.

*Example XIII*

An aqueous dispersion of polyethylacrylate was prepared from the following ingredients: 0.10 gram potassium persulfate, 2.0 grams sodium lauryl sulfate, 120.0 grams water and 80.0 grams ethyl acrylate. The mixture was stirred slowly for 4 hours under a blanket of nitrogen in a flask held at 40° C. The resulting product was found to contain 39% non-volatile polymer dispersed as spherical particles about $10^{-5}$ cm. in diameter.

A second mixture of the following ingredients was then prepared: 50 cc. of the first dispersion, 150 cc. of the dispersion of Example I and 200 cc. of a 1.0% solution of sodium alginate in water.

The composite was then extruded into a bath containing 2% by weight of calcium thiocyanate. The resulting gel fiber was passed continuously to a second bath by means of a roll turning at a peripheral rate of 20 feet per minute. This bath was a 58% solution of calcium thiocyanate in water heated to 90° C. After 30 inches of travel, the filament was transferred by another roll to a 10° C. water bath 3 feet in length. Following this, the filament was drawn through a 100° C. water bath with the take-out roll running six times as fast as the feed roll. The resulting continuous filament was strong and lustrous.

*Example XIV*

An aqueous dispersion containing 20% by weight of polyacrylonitrile and 0.5% by weight of sodium alginate was cast on a glass plate with a doctor knife of 0.025″ clearance. The plate was immersed in a 40% calcium chloride bath at room temperature for 13 seconds; a gel-like, opaque film was formed. The plate was then transferred to a 58% calcium thiocyanate bath at 80° C. After 30 seconds the film acquired strength and became clear. After this treatment, the film was washed free of salt with water and stripped from the plate. When dry, the film was clear and strong and could be drawn in boiling water in both directions.

*Example XV*

The dispersion of Example XIV was cast with a doctor knife with 0.010″ clearance. The procedure of Example XIV was repeated, using as the first bath 2% calcium thiocyanate at room temperature and as the second bath a 70% zinc chloride solution at 60° C. The washed and dried film had properties similar to those described in Example XIV.

*Example XVI*

A dispersion of polyethylene sebacate in an aqueous medial containing 30% solids was mixed with an equal volume of a filtered 1% aqueous sodium alginate solution. The mixture was extruded through a single holed glass capillary spinneret into an aqueous bath containing 2% calcium thiocyanate. The resulting filament was coalesced in ethanol and then washed in water to give a strong fiber. Benzene or mixtures of chloroform and methanol could also be used as the coalescing agent.

*Example XVII*

The following components were stirred together to give a fluid, homogeneous, aqueous dispersion: 50 cc. of polyacrylonitrile dispersion, 40% solids, as in Example I; 50 cc. of a dispersion of a copolymer of acrylonitrile and butadiene, polymerized in the weight ratio 45:55 and containing 35% solids, and 100 cc. of a solution of sodium alginate containing 1% solids.

This dispersion was extruded into an aqueous bath containing 2% hydrochloric acid, where it formed a filamentary coagulum of sufficient strength for transference to a second bath containing 56% calcium thiocyanate. After 10 seconds in this bath, the filament had changed from an opaque, white coagulum to a transparent, rubbery mass. This was washed and then drawn to 4× while in contact with a plate at 140° C. The resulting smooth and lustrous filament had tensile properties intermediate between those of fibers from the component polymers.

*Example XVIII*

An aqueous dispersion containing 20% by weight of polyacrylonitrile and 5% by weight of water-soluble cyanoethyl cellulose (0.62 cyanoethyl groups per anhydroglucose unit; 200 centipoise viscosity in 2% aqueous solution) was extruded through a slotted die into a 56% calcium thiocyanate bath heated to 90° C. The polyacrylonitrile particles in the initially formed gel film rapidly coalesced to a clear, slightly rubbery film which was then pulled over a weir and through a water bath. The wet films could be drawn in a boiling water bath in both directions. A clear, strong film was obtained.

*Example XIX*

A mixture of a 30% aqueous dispersion of tetrafluoroethylene/perfluoropropylene 80/20 copolymer and an equal volume of a 1% aqueous solution of sodium alginate was extruded from a glass capillary into a 2% calcium thiocyanate solution. The resulting gel filament was transferred continuously to a heated roll where it dried and the copolymer particles coalesced. The fiber was subsequently drawn 4× to yield a lustrous, flexible fiber.

*Example XX*

An aqueous dispersion containing 20% polyacrylonitrile and 0.5% sodium alginate was extruded into a bath of water containing 2% calcium thiocyanate. A continuous coagulated filament was formed. This filament was passed into a bath of molten ferric chloride hexahydrate held at 80° C., where the filament was held for 2 seconds and then removed to a water wash bath. The filament was then drawn, over a metal plate held at 168° C., to 6 times its original length. A smooth filament was obtained.

Example XXI

The polymer dispersion of Example I was mixed with an equal volume of an aqueous solution containing 0.5% sodium alginate and 0.5% of the sodium salt of a styrene-maleic anhydride copolymer. The modified dispersion was extruded through a 0.004" hole into a water bath containing 2% calcium thiocyanate. The resulting gel filament was pulled through a coalescing bath containing 56% aqueous calcium thiocyanate heated to 90° C. The coalesced filament was washed in cold water and then drawn 6× in a boiling water bath to yield a strong filament.

Example XXII

The polymer dispersion of Example I was mixed with an equal volume of an aqueous solution containing 6% of the sodium salt of a styrene-maleic anhydride copolymer. The modified dispersion was extruded through a 0.001" hole spinneret made of tetrafluoroethylene polymer into an aqueous bath containing 0.5% sulfuric acid, 20% sodium sulfate and 6% aluminum sulfate. The resulting filament was pulled through a coalescing bath containing 50% aqueous sodium thiocyanate heated to 90° C. and was then washed in cold water. This was then drawn 6× in boiling water to yield a strong filament with a stick temperature 40° C. higher than the filament of Example I.

Example XXIII

The modified aqueous dispersion of Example I was extruded through a one-hole spinneret of 0.004" diameter into a 2% aqueous solution of calcium thiocyanate. The resulting filament traveled through 5" of the setting bath and then over a weir into a bath containing a 5% aqueous solution of aluminum chloride. After 2 feet of travel in the second bath, it was transferred to a bath containing 56% aqueous calcium thiocyanate heated to 90° C. where it coalesced to a clear filament after 3 feet of travel. The filament was then washed in ice water and wound up on a bobbin at the rate of 32 feet per minute. After drawing 6× in boiling water, a strong oriented filament containing 0.1% aluminum was obtained. This filament dyed more deeply than the filaments obtained when the second bath was omitted or when a second bath containing 5% calcium chloride solution was used.

Example XXIV

The modified aqueous dispersion of Example I was extruded through a 0.004" diameter hole spinneret into a 2% aqueous solution of calcium thiocyanate. The gelled filament was coalesced in a bath containing a 78% solution of zinc bromide in methanol heated to 40° C. The resulting clear transparent fiber was then washed in cold water and drawn 7× in boiling water to yield a strong lustrous fiber. A coalescing bath containing 30 parts methanol and 70 parts of a 56% aqueous solution of calcium thiocyanate could also be used in place of the one described above.

Example XXV

A mixture of acrylonitrile and 0.6 mol percent of ethylene bis-methacrylate was polymerized in an aqueous emulsion according to the procedure generally used for preparing polyacrylonitrile. When polymerization was complete, the dispersion contained 40% by weight of the cross-linked polymer. This dispersion was mixed with an equal volume of a 40% solids dispersion of linear polyacrylonitrile prepared as described in the preceding examples. This mixed dispersion was then mixed with an equal volume of a 1% solution of sodium alginate to give a modified dispersion containing approximately 20% solids. This dispersion was extruded into a 2% aqueous solution of calcium thiocyanate. The filament was then passed into a bath containing 56% aqueous calcium thiocyanate heated to 95° C., where it coalesced to a clear filament after three feet of travel. After being drawn 6× at 150° C., the filament had the following properties: tenacity=2.9 g.p.d., elongation=13%, and initial modulus=78.

Example XXVI

A dispersion of poly(ethylene terephthalate)/poly-(ethylene sebacate) (60%/40%) copolymer was prepared by emulsifying 400 parts of a 5% chloroform solution of the polymer in 150 parts of water containing 0.8 part of sodium lauryl sulfate. The solvent was removed under partial vacuum to give a dispersion containing 12% solids and this was concentrated to 23% by evaporation of water at 50° C. under partial vacuum.

Seven parts of the above dispersion was mixed with one part of a 2% solution of sodium alginate to give a modified dispersion. The modified dispersion was spun into an aqueous bath containing 5% calcium chloride and 5% hydrochloric acid at room temperature. The gel fiber so obtained was coalesced over a hot pin at 125° C. and subjected to a net cold draw of 2.5×. The resulting elastic fiber had a tenacity of 0.32 gram per denier and a breaking elongation of 197%.

Example XXVII

A solution containing 17.1 parts of 4,4'-isopropylidenediphenol, six parts of sodium hydroxide, three parts of sodium lauryl sulfate, and 300 parts of water was prepared in a blendor. A second solution containing 10.2 parts of isophthaloyl chloride, 5.0 parts of terephthaloyl chloride and 100 parts of toluene was added to the rapidly agitated aqueous solution in the blendor. After stirring for a period of 3 minutes, the emulsion was filtered to remove any flocculated solid. The filtered emulsion was deionized using ion exchange resins and brought to a pH of 7. A second dispersing agent (1 part) ("Daxad" 11, polymerized sodium salts of alkyl naphthalene sulfonic acid) was added and the emulsion concentrated by evaporating under vacuum. The emulsion containing 2% polymer solids was converted to a dispersion containing 26% polymer solids by removal of the organic solvent and excess water.

A 1% solution of sodium alginate (50 parts) was added to 50 parts of the dispersion to obtain a smooth viscouse white mixture. This modified dispersion was filtered into a blowcase equipped with a sand pack filter and a viscose type spinneret. The modified dispersion extruded through the spinneret was coagulated into a self-supporting fiber in a 2% aqueous calcium thiocyanate bath. The coagulated fiber was coalesced in a bath of warm pyridine and air-dried under infrared lamps before winding up. The fiber could be cold or hot drawn to a strong fiber.

Example XXVIII

A solution consisting of 40 parts of the polyurethane from piperazine and 1,4-cyclohexanediolbischloroformate, 4 parts of oleic acid and 400 parts of chloroform was emulsified with 140 parts of water in a blender to give a viscous water-in-oil emulsion. A solution of 0.56 part of sodium hydroxide, one part of dispersing agent ("Daxad" 11, polymerized sodium salts of alkyl naphthalene sulfonic acid) and 50 parts of water was added to the thick emulsion, and it immediately inverted to a thin oil-in-water emulsion. The chloroform was removed by evaporation under reduced pressure at a temperature of 35° C. to yield a fluid dispersion of the condensation polymer.

The fluid dispersion (100 parts) was mixed with 100 parts of 1% sodium alginate solution and allowed to concentrate by reverse creaming. The clear supernatant liquid was decanted and a smooth, viscous, modified dispersion containing 20% polymer solids was obtained. This dispersion was filtered into a blowcase equipped with a sand pack filter and a viscose type spinneret.

The modified dispersion was extruded into an aqueous bath containing 2.5% calcium acetate and 1% acetic acid. The resulting gel filter was coalesced in 90% formic acid, washed in 50% aqueous ethanol, talced, and air dried under infrared lamps before being wound up. The fiber was drawable 8.5× in a steam tube to a strong fiber.

*Example XXIX*

A solution of 0.2 part of oleic acid and 10 parts of a copolymer containing 0.75 mol of 2,5-dimethylpiperazine terephthalamide and 0.25 mol of the polyurethane from 2,5-dimethylpiperazine and ethylene bischloroformate in a mixture of 245 parts of chloroform and 35 parts of methanol was emulsified by vigorous stirring in a solution of 0.029 part of sodium hydroxide in 100 parts of water. The volatile solvents and water were removed under reduced pressure until a fluid dispersion containing 40% solids was obtained.

Equal volumes of the above dispersion and a 1% aqueous solution of sodium alginate were mixed together. This modified dispersion was filtered through a sand pack containing 80–150 mesh sand and then extruded through a metal spinneret with five four-mil holes into an aqueous solution containing 2.5% calcium acetate and 1% acetic acid. The resulting gel fiber was passed continuously over a nearly submersed weir into a bath of 78% zinc bromide in methanol held at 82° C. The coalesced fiber was then washed in ice-cold water and wound up at the rate of 34 feet per minute. After drawing the fiber 3.7× in boiling water it had a tenacity of 2.0 g.p.d. and an elongation to break of 14%.

*Example XXX*

An 8% slurry of polytetramethylene urea in an aqueous solution of 0.5% sodium lauryl sulfate was ball-milled for forty hours. The resulting dispersion was concentrated by centrifuging to 20% solids content. Sixty parts of this concentrate, 4.5 parts of an aqueous 10% sodium alginate solution and 35 parts of water were then mixed together and ball-milled for five hours. The resulting modified dispersion was filtered through a sand pack of 40–60 mesh sand and deaerated under vacuum before extruding through a 7 mil hole in a polytetrafluoroethylenespinneret into an aqueous setting bath containing 5% calcium acetate and 1% acetic acid. The resulting gel filament was passed continuously through an ethanol bath, then through a 70% ethanolic zinc bromide bath at 80°, and finally through an isopropyl alcohol bath, after which it was wound up. The air-dried fiber could be drawn 3× over a hot pin at 385° F.

*Example XXXI*

An aqueous solution containing 16% poly(vinyl alcohol) was mixed with a dispersion comprising 60% by weight of polytetrafluoroethylene dispersed in an aqueous medium containing 6% by weight (based on the total weight of the composition) of "Triton" X-100 (a nonionic dispersing agent made by Rohm & Haas). This modified dispersion was extruded through a 10 mil spinneret into a 125° C. air bath. A filament with a self-supporting length of 5 feet was formed. This was sintered on a hot plate at approximately 400° C. to produce a drawable polytetrafluoroethylene filament.

*Example XXXII*

A modified spin mix was prepared by dissolving poly(vinyl alcohol) in an aqueous dispersion of polytetrafluoroethylene; the final dispersion contained 42% polytetrafluoroethylene and 3% poly(vinyl alcohol). This composition was extruded in conventional wet spinning equipment, using a 10 mil spinneret and a 14" long spinning bath containing a saturated aqueous boric acid solution maintained at 40–45° C. The threadline set up readily in this bath and the thread was wound up at 70 feet per minute. The gel fiber had a strength of about 0.1 g.p.d. and could be back wound from the bobbin after drying. The gel fiber could be sintered and drawn as described in Example VIII.

From the above examples it can be seen that novel gel fibers comprising the water-insoluble, synthetic polymer and the matrix material are produced. It is surprising that these can be led through long baths in an unsupported fashion when it is realized that the synthetic polymer particles constituting the major proportion of the gel fiber solids are in an uncoalesced form and contain from 20 to 90% water, generally, 60 to 85%. The gel-fibers of this invention have self-supporting lengths of at least one foot. This length is a measure of the maximum length of a particular gel fiber that can be held up vertically without breaking. Self-supporting lengths of over seven feet have been produced. These lengths, of course, depend upon the synthetic polymer, the matrix, the setting media and similar factors but must be at least one foot for satisfactory spinning. These gel-fibers can be wound up and stored or treated in package form in subsequent steps such as washing or coalescing. They contain from 20 to 90% water with a major proportion of the solids being the synthetic fiber-forming polymer and about 1% to about 35% of the matrix material based on the total dry weight of the gel fiber. Gel fibers having about 1% to about 10% of the matrix material (based on the solids) and 60 to 85% water are preferred.

As shown in the examples, the gel fibers are of utility chiefly when they are coalesced to produce a continuous phase of the fiber-forming polymer which originally existed in dispersion form. However, such coalescence need not take place for the gel fibers to be useful. Rather, the gel fibers themselves can be packaged, transported, wound, unwound, twisted and treated by various conventional textile processes as well as by other obvious processes. For example, the gel fibers can be cut into staple lengths and, either alone or in combination with other staple fibers, such as polyamide, polyester or glass fibers, or cellulose pulp fibers, can be formed into non-woven sheets, webs, batts or papers, employing either a binder or other means. Then the non-woven web can be sintered to give a sheet structure comprising the hard-to-handle polymers already described in novel and useful configurations. Furthermore, because of their gel structure, these fibers can readily be dyed by simple dyeing processes, and even after sintering, when suitable dyestuffs are employed, the final product will contain the dyestuff. In addition, other materials, such as metal salts, colloidal metallic or non-metallic particles, plasticizers, modifiers, pigments and other materials can be added to the gel fibers and be retained in the final fiber after sintering. Also, the gel fibers are readily bonded to one another and to other materials by virtue of their gel structure, and can therefore be made into useful self-bonded structures before coalescing.

For convenience much of the foregoing discussion has been limited to the preparation of fibers and filaments. It should be clearly understood, however, that this new invention is not limited to the production of these articles. It applies equally well to the formation of fibers, filaments, threads, films, foils, tapes, ribbons, bristles and the like.

In general, water-insoluble, synthetic linear polymers having a molecular weight of 10,000 or higher are suitable for preparing films and fibers by means of this invention. Some of the many polymers that can be used include: acrylonitrile polymers and acrylonitrile copolymers; polyacrylic and polymethacrylic esters, such as poly(methyl methacrylate); poly(vinyl chloride) and copolymers of vinyl chloride with vinyl esters, acrylonitrile, vinylidene chloride and the like; copolymers of vinyl compounds with conjugated dienes such as butadiene; vinylidene chloride polymers; polyethylene; polytetrafluoroethylene; polychlorotrifluoroethylene; poly(vinyl acetate); poly(methyl vinyl ketone); polyvinyl ethers; chlorosulfonated polyethylene; poly(vinyl carbazole); poly(vinyl acetals); partially hydrolyzed poly(vinyl esters); polyamides, such as poly(hexamethylene adipamide), poly(N-methoxymethyl hexamethylene adipamide), poly(ethylene sebacamide), poly(methylene bis-[paracyclohexylene]adipamide); polyureas, such as poly(tetramethylene urea); polyurethanes, such as those described in copending applications S.N. 345,727, now U.S. Patent 2,731,445, and S.N. 345,728, now U.S. Patent 2,731,446, both filed on March 30, 1953; polyesters, such as poly(ethylene terephthalate), and copolyesters, such as those disclosed in copending application S.N. 329,114, filed December 31, 1952 and now abandoned; polyesteramides, for example, those disclosed in copending applications S.N. 389,501, filed October 30, 1953, and S.N. 383,410, filed September 30, 1953, both now abandoned; polythiolesters, such as those disclosed in copending application S.N. 366,689, filed July 8, 1953, now U.S. Patent 2,870,126; polysulfonamides; polysulfones; polyethers; and many others. As illustrated above, copolymers of all types can be used as well as the homopolymers listed above. The term copolymer is intended to include all types, such as random, ordered, segmented or block, and graft copolymers. The polymer particles may even be cross-linked, providing the degree or tightness of cross-linking is not sufficient to prevent the coalescence required to produce the desired structure.

The process can also be employed to convert a mixture of polymers into a shaped structure from a single aqueous dispersion. Cross-linked polymer particles can also be used as a part of the polymer mixture. The major requirements are that the cross-linked polymer be capable of being prepared in dispersion form and that this dispersion be compatible with the dispersion of linear polymer particles. The cross-linked polymer components constitute a minor amount (i.e., less than 50%) of the total polymeric constituents. Depending upon the type of cross-linked polymer employed, these polymer particles may remain discrete in the final shaped article or they may be partially or wholly fused with the linear polymer components. Products with special modified properties may be produced in this manner. Spinning of a mixture of this type is described in Example XXV.

The term "aqueous dispersion" refers to an aqueous medium in which discrete particles of polymer are dispersed homogeneously. These particles may be in the colloidal range of particle size less than about 15 microns, preferably 0.005 to 1.5 microns. Polymer particles of this size are obtained, if necessary, by mechanical means, such as by use of micronizers, homogenizers, ball mills, and similar pulverizers. The reduction in size of the polymer particles may be accomplished when the polymer is in the dry state or while it is in the form of a slurry, such as by the use of a three-roll paint mill.

The dispersions may be prepared in many ways. For example, they are prepared readily by mixing finely divided polymers with water in the amount desired. The water should preferably contain an emulsifying agent when using this method. In some instances one may wish to prepare a dispersion from a solution of the polymer. This is accomplished by mixing the solution with an aqueous medium. Under the proper conditions polymer dispersions are obtained in which the particles are of appropriate size for use in this process. Suspensions of appropriately fine polymers, as obtained from emulsion polymerization processes in aqueous media, may be employed directly and are preferred when they can be prepared.

Polymers are also obtained frequently as dispersions in organic media. For example, condensation polymers prepared by the interfacial polymerization technique may be obtained as discrete polymer particles dispersed in the organic phase. An aqueous dispersion can be obtained from this without isolating the polymer by mixing the dispersion with an aqueous medium. If the water wets the polymer particles preferentially, which wetting usually requires the addition of an emulsifying agent, the polymer particles will transfer from the organic to the aqueous phase. The organic phase can then be withdrawn and the aqueous dispersion utilized in this process.

The polymer dispersions described in the examples were all prepared by batch methods. However, these dispersions can be prepared by continuous processes. Generally, better control of polymerization conditions is required for preparation of stable dispersions by continuous processes. The most critical requirements are: (1) rigid control of reaction temperatures, (2) rigorous exclusion of dissolved or gaseous oxygen from the system, and (3) precise control of the flow rate of the reacting streams. For example, dispersions of polyacrylonitrile have been prepared by a continuous process. The apparatus consisted of two vessels in series. Into the first of these were metered (1) an aqueous solution containing catalyst and detergent, (2) an aqueous solution of the activator, and (3) deionized acrylonitrile. The quantities were introduced to produce a 40% solids dispersion of polyacrylonitrile in water. The temperature was controlled at 40.4±0.2° C. and the catalyst and activator concentrations were 0.125% and 0.003%, based on monomer. Average conversion of monomer was about 95% to produce a stable dispersion of polyacrylonitrile with particle size varying from 0.02 to 0.22 micron.

Considerable control over the molecular weight of polyacrylonitrile obtained by dispersion polymerization can be exercised by controlling the rate of addition of monomer to the polymerization. If the polymerization is initiated in the presence of the entire amount of monomer, a polymer with a number average molecular weight of 41,000±3,000 is obtained. If the polymerization is initiated with only a portion of the monomer in a reaction vessel containing water, catalyst, activator, and surface-active agent, and monomer added at a rate slightly lower than the rate at which it can be utilized, a polymer with a number average molecular weight in the range 70,000±15,000 is obtained. Very high molecular weight polymers can be utilized to advantage in this invention, and it is desirable to have methods available for controlling the molecular weights of the polymeric products.

Coagulation or sludging of the dispersions sometimes occurs as a result of uncontrolled polymerization of residual monomer remaining at the end of an emulsion polymerization. This problem can usually be avoided by proper control of the polymerization conditions. In systems which are particularly hard to control the difficulty can usually be overcome by adding a polymerization inhibitor at the end of the polymerization. This method can be used for both continuous and batch polymerizations. The stability of polyacrylonitrile-sodium alginate spin mixes can be increased by adding small amounts of ammonia. Thus, it may be seen that the synthetic linear condensation or addition polymers are dispersible by a variety of techniques and the process of this invention is very adaptable to the shaping of these fiber-forming materials.

The strength-providing matrix comprises a polymeric gel formed during the extrusion process by the physical or the chemical action of the setting medium. Gellable polymers useful as matrix-forming materials have been found to have both of the following characteristics: (1) they dissolve in water or an aqueous medium which has a pH of somewhere between 1 and 14 and a temperature somewhere between 0° and 100° C., to produce a solution containing at least 0.5% by weight of the polymer, and (2) a saturated solution or a 10% solution of the polymer forms a self-sustaining film when spread on a glass plate and immersed in any one of a large variety of liquids typified by an acid aqueous solution containing 2% sulfuric acid and 25% sodium sulfate (based on the total weight of the mixture), a basic aqueous solution containing 2% sodium hydroxide and 25% sodium sulfate, an aqueous salt solution containing 6% aluminum sulfate and 20% sodium sulfate, an aqueous solution containing 3% sodium alginate, or a 95% solution of ethyl alcohol. Polymers which have a molecular weight greater than 5,000 and which meet the above two requirements have been found to be very suitable as matrix-forming materials. The procedures are given merely as convenient means for testing and comparing the efficacy of the matrix-forming materials.

The matrix-forming material comprises a cationic, polymeric electrotyte, an anionic, polymeric electrolyte or a neutral or non-ionic polymeric material which is soluble in the dispersion of the fiber-forming polymer and which can be shaped in an aqueous or non-aqueous medium. Proteins are amphoteric and may be considered to be both cationic and anionic polymeric electrolytes. Suitable anionic, polymer materials contain a plurality of acidic groups, such as carboxyl, sulfonic and/or phosphoric or other acid groups. Specific polymers and classes of polymers which are applicable as matrix-forming materials in this process include the following: alginates, carboxyalkyl celluloses, carboxymethyl hydroxyethyl celluloses, cellulose sulfates, sulfoethyl celluloses, carbohydrate gum extracted from Irish moss, locust bean gum, polymetaphosphates, silicates, lignin sufonnates, pectinates, pectates, casein, zein, gelatin, egg albumin, starch glycolates, polyacrylates, polymethacrylates, beta-carboxyethyl methacrylate polymer, beta-carboxyethylacrylate polymer, water-soluble modified styrene polymer resins, partially hydrolyzed polyacrylamide, and the like. Copolymers of acrylic and methacrylic acids, methavrylic acid and methylcellosolve acrylates, vinyl acetate and allyl glycidyl ether, alkaline solutions of styrene-maleic anhydride copolymer and the like may also be used. In copending application of Burrows and Jordan, S.N. 449,522, filed on August 12, 1954, now U.S. Patent 2,772,444 it is disclosed that viscose may also be used with polytetrafluoroethylene dispersions under the proper conditions. Copending application S.N. 512,591 now U.S. Patent 3,087,903, discloses that properly modified viscoses may be used with polyacrylonitrile dispersions. Usually, it is required that the viscose be prepared in a special way or modified in some manner to make it compatible with polymer dispersions. Once the dispersions has been prepared properly, it can usually be shaped by this process without difficulty. In most cases the monovalent alkali metal salts of the anionic polymeric electrolytes are more solubles in water and are preferred.

Cationic, polymeric electrolytes suitable as matrix-forming materials contain a plurality of basic groups. These are usually amino and/or quaternary ammonium groups. Examples of useful cationic, polymeric electrolytes are casein, zein, gelatin, egg albumin, polyvinylpyridine, deacetylated chitin, polyethyleneimine, diethylaminomethyl methacrylate polymer; hydrolyzed vinyl acetate copolymers with a vinylpyridine, N-vinyl phthalimide, N-vinyl succinimide, dimethylaminoethyl vinyl ether, or N-(2-vinyloxyethyl) formamide; other vinyl substituted amino and masked amino polymers; and quaternary ammonium compounds, such as polybetamethacrylyloxymethyltriethylammonium bromide, poly-beta-methacrylyloxyethyltrimethylammonium methyl sulfate and the quaternary ammonium salts from the reaction of alkyl halides with polyvinylpyridine.

Neutral polymers which may be used as matrix-forming materials include propylene glycol algin ester, methylcellulose, hydroxyethyl cellulose, ethylhydroxyethyl celulose, cellulose acetate, urea-formaldehyde and melamine-formaldehyde resins, amylopectin, allyl starch, cyano- ethylcellulose, polyvinyl alcohol, polyvinylmethyl ether, polyacrylamide, and poly-N,N-dimethylacrylamide.

Only small amounts of matrix-forming material are required to provide definite advantage over none at all. The quantity used ranges from 0.10% to 10% by weight of the dispersion, with 0.25% to 5% being preferred. The specific quantity preferred varies with the matrix material.

The mixing operation may be carried out in any one of a number of ways. For instance, the finely divided dry polymer may be added to a solution of the matrix-forming material or the dry polymeric matrix-forming material may be added to an aqueous dispersion or emulsion of the fiber-forming polymer. It is also possible that the dry polymer and dry matrix-forming material may be mixed and incorporated simultaneously in an aqueous medium. A preferred method is to mix a water solution of the matrix-forming material with an aqueous dispersion of the polymer obtained by an emulsion polymerization process. Another process, which might be preferred for preparing high solids dispersions for simplified commercial processes, involves preparing the modified dispersion by polymerizing the monomer in a solution of the matrix-forming material. Certain precautions may be necessary in preparing these modified dispersions directly in order to avoid gelation of the matrix-forming material and/or coagulation of the polymer. Typical adjutsments which may be required are: (1) portion-wise additions of the monomer during the reaction, (2) reduction of polymerization temperature, (3) reduction of catalysts and activator concentrations. One, none, or all of these process variables may need to be modified in order to produce a satisfactory dispersion. An example of this method would be the polymerization of acrylonitrile in a solution of sodium alginate.

The modified dispersions, that is, those containing the matrix-forming material, are flowable, especially when the polymer concentration is less than about 60% by weight. The first step in using these dispersions is to shape the modified dispersion, which preferably contains from 5% to 60% by weight of water-insoluble polymer, in substantially the desired form by extruding it through a shaped orifice into a precipitating or immobilizing medium. Filtration of the dispersions prior to extrusion is essential for continuous operation at a commercially acceptable level. Graded sand pack filters have been found to be quite satisfactory for this purpose, as is shown in Examples XXVII–XXX. The previous examples did not mention this feature, since they were carried out on a relatively small scale. Generally, the behavior on extrusion is substantially the same with or without filtration. When the dispersion has been extruded during this first stage of the process, Brownian motion of the polymer particles practically stops and the matrix forms a gel-like structure which supports the particles.

The setting or immobilizing medium may be any liquid or vapor capable of precipitating or gelling the matrix-forming material. This includes air and vapors such as volatile strong acids, e.g., hydrogen chloride. Also useful are various other compounds and/or mixtures in liquid or vapor form, such as water-miscible organic compounds and aqueous solutions of solid, liquid, or gaseous inorganic and/or organic compounds. Preferably, aqueous solutions are used which contain a low concentration (e.g., 0.5–40% by weight of the aqueous solution) of an electrolyte or a non-electrolyte. Typical useful non-electrolytes are water-miscible organic liquids, such as alcohols, ketones, or glycols. High or low temperatures may be used in coagulating baths to develop the desired precipitating qualities of the particular setting agent being used.

When aqueous baths are used, the anionic and cationic matrix-forming materials will generally be formed into shaped articles through gelation as a result of chemical action on the materials by the coagulating bath. Aqueous solutions of polyvalent metal salts are particularly useful as precipitants when an anionic matrix-forming material is used. For example, when an aqueous dispersion of polyacrylonitrile containing sodium alginate is spun into filaments, a preferred setting medium comprises 5% by weight aqueous calcium thiocyanate. Among other polyvalent metal salts which may be used successfully as precipitants and gelling agents for anionic matrix-forming agents are: aluminum sulfate, potassium aluminum sulfate, barium thiocyanate, zinc chloride, magnesium bromide, calcium iodide, and chromous nitrate. In many cases, where these baths contain polyvalent metal ions, such as calcium, chromium, beryllium, zinc, and manganese, salt links are probably formed between adjacent polymeric electrolyte molecules to produce a three-dimensional structure. Regardless of the mechanism, the precipitated matrix is water-insoluble and possesses a fair degree of wet strength.

Many materials, such as alginic acid, are insoluble in water but are soluble as salts or in bases, so aqueous solutions of acids, such as hydrochloric, sulfuric, and sulfamic acids can be used as precipitants. Similarly, matrix-forming materials which are soluble in acids but insoluble in water may be precipitated by use of bases. When desired or needed, additives may be used in either the spinning solution or the coagulating bath to modify the coagulating action and produce an altered or improved gel fiber. For example, carboxymethyl cellulose with a degree of substitution less than 0.82 does not form a fiber in a 40% calcium chloride bath. However, when as little as 0.25% sodium hydroxide is incorporated in the carboxymethyl cellulose solutions, fibers are obtained when the solution is extruded into calcium chloride baths. A better fiber structure is formed in this way.

When a neutral, water-soluble polymeric material is used, physical gelling action of the coagulating bath will most likely be involved. For example, polyvinyl alcohol is a good matrix-forming material in many instances, being soluble in water, compatible with the aqueous dispersion of polymer, but insoluble in many organic liquids or aqueous solutions suitable as setting and/or coalescing media for polymer dispersions. The following compositions have been used as setting media for non-ionic matrix-forming material: 50% aqueous ammonium sulfate, 40% aqueous calcium chloride, 30% aqueous aluminum sulfate, and 50% aqueous ammonium acetate.

The choice of matrix-forming material will depend to some extent on the water-insoluble, dispersed polymer. It is obvious that one will use a matrix-forming material which will not coagulate the polymer in the dispersion prior to shaping. Appropriate mixtures, such as a neutral with a cationic matrix-forming material, may also be used. In all cases, precipitation is practically instantaneous, the time required being of the order of 0.04 second. It is, of course, obvious from the earlier discussions that liquid baths may be replaced by other fluid setting media, such as air.

In the second stage of the process, the substantially immobilized water-insoluble polymer particles coalesce, or flow together without destruction of the formed article. Coalescence is achieved in various ways, the preferred method for any one polymer depending upon the polymer itself. Many polymers, when heated above their second-order transition temperatures, will coalesce without the addition of a chemical agent. N-alkoxymethyl substituted nylons are self-coalescible in this manner.

The following test may be used to determine whether the polymer can be coalesced without the use of any chemical agent: approximately one-tenth gram of the finely divided polymer is placed upon a heated surface. The temperature of the surface is gradually raised. If the polymer forms a coherent mass at some temperature below the decomposition temperature, then high temperature alone may be used to coalesce the polymer.

The majority of polymers, however, require the addition of a coalescing agent, e.g., a hydrotropic salt or a solvent or a plasticizer to promote coalescence. Suitable chemical agents are materials which are liquid or gaseous at the temperature of the process, particularly organic compounds and aqueous solutions. The chemical coalescing media may in some cases be preferred even for those polymers which can be coalesced by heat alone. Organic vapors, such as those of N,N-dimethyl formamide and N,N-dimethylacetamide or similar solvents, may be used as coalescing media.

The ability of the chemical agent to dissolve the polymer is determined readily by stirring 0.1 gram of the finely divided polymer in 10 cc. of the liquid to be tested. The mixture is also heated if necessary. Soluble, low molecular weight polymers tend to pass rapidly into solution, while soluble, high molecular weight polymers first adsorb the solvent and come together to form larger masses. This "balling up" is generally followed by solution formation upon heating and materials which cause this phenomenon are solvents for the polymer tested. Thus, it is observed whether the polymer passes freely into solution or whether it first balls up to a coherent mass. In either case, the liquid is a solvent or a plasticizer which can be used as a coalescing agent. Organic liquids, aqueous organic media, and concentrated aqueous solutions of salts and mineral acids which meet this test will coalesce the shaped structure to a relatively strong rubbery article.

For low cost, ease of handling, and safety in use, aqueous solutions are generally preferred for coalescing. Certain salt solutions have a specific solubilizing action on some polymeric materials, such as polyacrylonitrile, and particles of these polymers in the form of shaped articles and fibers can be coalesced by exposure to such salt solutions. Included among the salts which, for example, are highly useful in coalescing the gelled structures of polyacrylonitrile and of many of the polymers shaped in accordance with this invention, are lithium thiocyanate, lithium iodide, lithium bromide, sodium thiocyanate, sodium iodide, potassium thiocyanate, magnesium thiocyanate, calcium thiocyanate, calcium iodide, calcium bromide, manganese thiocyanate, zinc thiocyanate, zinc iodide, zinc bromide, zinc chloride, cadmium iodide, antimony trichloride, the chlorides, bromides, and iodides of tin, iron, and cobalt, as for example, ferric chloride, ferric bromide, ferrous bromide, cobaltous iodide, and the like. Some or all of the salts may be allowed to remain in the final shaped article and be used to modify the properties. For example, when antimony trichloride is used as a coalescing agent for polyacrylonitrile, the chloride can subsequently be hydrolyzed to the oxychloride and a flame proof polyacrylonitrile fiber or film obtained. Organic thiocyanate salts such as guanidine thiocyanate, are also applicable. The preferred salts for use with polyacrylonitrile are calcium thiocyanate and zinc chloride.

Water-soluble salts used for preparing the coalescing solutions are preferably metal salts of inorganic acids. These salts should be sufficiently soluble in water to yield 10% solutions and, preferably, 30% solutions. Furthermore, concentrated aqueous solutions of the salt being used are capable of dissolving the polymer being processed at some temperature up to the boiling point of the salt solution, for example, from 0° C. to 175° C., and generally from 20° C. to 120° C. The salts operable for use in the process of this invention are in general found among the water-soluble thiocyanates, iodides, bromides, and chlorides of Group I and II metals of atomic numbers 3 to 38 or compatible mixtures of these salts. Mixtures of salts can frequently be used to advantage. For example, there is a tendency for filaments to fuse when coalesced in a concentrated calcium thiocyanate bath if they are of heavy denier or if long coalescing time is required. This tendency to fuse can be substantially eliminated by the addition of zinc chloride to the calcium thiocyanate bath. The beneficial effect of zinc chloride is about proportional to its concentration but the amount which can be used is limited by its solubility in the calcium thiocyanate solution. When a solubilizing salt is employed as an aid to coalescence, it is preferred that the salt remain in solution when it is present in the shaped structure, but this is not necessary. Intractible polymers, which have very limited solubility and/or which melt with decomposition, are the most difficult to coalesce and generally require the use of salt solutions containing organic liquids, such as methanol, chloroform, and dimethylformamide.

Coalescence can also be achieved by use of an organic coalescing agent alone. Organic compounds which are to be used as coalescing agents should, preferably, be capable of dissolving the polymers at a temperature below their boiling points. However, temperatures higher than the boiling point of the liquid may be used for conducting the process in the vapor phase or under pressure. In practice, any coalescing agent need only exert a solvent action on the polymer that can be regulated to achieve the desired fusing of the discrete polymer particles. Organic compounds suitable for coalescing polymers include dimethylformamide, meta-cresol, xylene, methyl ethyl ketone, tetramethylurea and adiponitrile. Dimethyl formamide, dimethylacetamide cyclohexanone, aceteophenone, and mesityl oxide are compounds which are particularly useful for coalescing poly(vinyl fluoride) particles. In addition to substantially pure hydrocarbons, mixture of hydrocarbons, such as an aliphatic petroleum oil, may also be used as coalescing media.

The modified polymer dispersion may be extruded into a setting medium which will precipitate the matrix-forming material but which exerts little or no solubilizing action on the polymer particles. Thereafter, the shaped structure is exposed to the coalescing action of a solvent which is capable of dissolving the water-insoluble polymer. In most cases this has been found to be the preferred method of operation. However, it is possible to extrude the polymer dispersion into a liquid medium which will precipitate the matrix-forming material and will also exert solvent action on the polymer particles in the precipitated matrix.

The exposure to this coalescing action of the solvent may be accomplished by passing the coagulated article containing the polymer particles through such a solvent or by air-drying the shaped article which has occluded minor amounts of a solvent. In either case, the coalescing process is speeded up substantially by the use of a coagulating bath having a strong dehydrating effect. Best results were obtained with organic dehydrants, such as acetone or alcohol, but concentrated inorganic salt solutions are also effective. Dehydrating baths which contain at least 1% of a dissolved calcium salt have been found to be particularly effective.

Non-aqueous coagulating baths have been found to be particularly useful where the air-drying coalescence method has been used. Use of alcohol or acetone solutions of materials such as calcium thiocyanate and zinc bromide promotes more rapid coalescence since the solvent for the coalescing agent can be removed much more rapidly. The gel fibers are strengthened as a result of the deswelling action of the organic medium. In any case, the time of exposure to the solvent action is so regulated that the particles coalesce without destroying the shaped structure. The articles that are obtained, such as films or fibers, have properties that are as good as or better than corresponding properties of articles produced by conventional processes.

As the polymer dispersion leaves the extrusion orifice, the matrix precipitates into an article whose general cross-section depends on that of the orifice. This precipitation occurs very rapidly in the vicinity of the orifice whether or not the coagulant contains sufficient solubilizing agent to dissolve the polymer. Coalescence is marked by an abrupt change from an opaque gel-fiber to a substantially clear material, much stronger than the gel-fiber.

One of the most surprising features of this process is that a structure is produced in which the matrix-forming material and the polymer appear to be compatible. Since the polymer and matrix-forming material differ materially in such properties as solubility, the final compatibility would not be anticipated. While the fate of the matrix-forming material in the final shaped article is not known with certainty, the matrix-forming material can be detected, if necessary, by the use of refined physical techniques such as infrared adsorption spectroscopy. Even when detected, it is generally impossible to determine whether this material is present as discrete particles or as separate chains or as segments of the main polymer chain. The compatibility in the final article of the two radically different materials is surprising.

In coalescing the polymer particles room temperatures or lower can be used, but it is generally preferred that the coalescing bath be heated, since less time is needed. For example, temperatures of the order of 30–175° C. may be employed momentarily in transforming the semirigid shaped article to a transparent, coherent film or fiber. Low time consumption is preferred in continuous processes, and it is advantageous that the coalescence step consumes only a few seconds or less. It is also advantageous in handling polymers of high minimum solution temperature. With short contact time, the actual temperature achieved is relatively immaterial with respect to the degradation of polymer.

Any of a number of heating media may be used for polymers which may be coalesced by heat alone. These include: liquid media such as molten Woods metal or inert hydrocarbons which are liquid at the desired temperature; gaseous media such as air, inert gases and vaporized nonsolvent liquids; fused salt baths; radiant heat such as is provided by infrared lamps; and heated solid surfaces such as wheels, rods, bars, and plates. Combinations of these media may also be used. For example, the tetrafluoroethylene polymer particles in a gel filament obtained from a dispersion in sodium alginate solution may be coalesced by lifting through a stream of hot air onto a wheel heated to 380° C. The particles sinter on this wheel to produce a strong, drawable continuous filament.

The exact conditions of polymer solubility, and correspondingly the ability to be coalesced, varies somewhat with each combination of polymer and coalescing agent. The time required for coalescence depends on the relative solubility of the polymer in the coalescing medium, the temperature of the coalescing bath, and the denier or thickness of the shaped article. Fine denier filaments, e.g., 10 denier or less will coalesce in saturated aqueous solutions of solvent salts in about two seconds, whereas heavy denier filaments, of the order of 200 denier will require one minute or more exposure to the same saturated salt solution. Elevated temperatures shorten the required contact time. When air-drying is used to concentrate the coalescing agent adhering to the coagulated shaped article to the point where the polymer is coalesced, the same considerations apply. Also, the concentration of the coalescing agent is a factor, higher concentrations promoting more rapid coalescence. As an example of the influence of these various factors, a polyacrylonitrile filamentary structure of approximately 200 denier shaped in an 8% by weight aqueous calcium thiocyanate solution required twenty minutes heating in an oven at 100° C. to coalesce, while a ten denier filament shaped in a 20% by weight calcium thiocyanate solution required only 10 seconds in room temperature air to coalesce.

Removal of the coalescing agent from the shaped polymer is readily effected by washing. In washing multifilaments it is generally preferred that cold water be used. The resulting structure may then be after-treated with boiling water, and, if desired, stretched to orient the molecules to effect improvement in physical properties. On the other hand, the coalesced structure may at least be partially oriented by drawing prior to the washing step.

The term "dispersion" has been used frequently in the foregoing discussion in contradistinction to the term "solution." The term "solution" has generally been limited to homogeneous mixtures of two or more molecular species whereas the term "dispersion" has generally been reserved for colloidal systems or suspensions in which the dispersed phase consists of either very large molecules or molecular aggregates. The distinction between the two classes is usually based on the particle size of the dispersed phase, but the prior art frequently erroneously refers to solutions as dispersions. In the present invention the particles of fiber-forming polymer are not molecularly dispersed. The term "dispersion" has been used but the useful range of particle size is not limited to the 0.005 to 0.2 micron range frequently given as the limits for colloidal dispersions, since dispersions containing larger particles of dispersed polymer may also be used.

The particle size of the matrix-forming materials in water are sufficiently small so that these mixtures are aqueous solutions. The particles of the fiber-forming polymer are not molecularly dispersed so that the modified aqueous dispersion has two phases, a solution phase comprising water and the matrix-forming material and a particulate phase involving discrete polymer particles. It is very surprising that in the present invention the polymeric electrolyte in solution form can be used as a supporting medium in the form of a gel structure and that the polymer to be shaped can be supported as discrete particles by the gel. No external support of the shaped article is necessary. Thus, not only is the over-all process described here unique but it may be seen that the individual steps differ from those described in the prior art.

In the present invention the spinning of filaments may be carried out with the aid of spinning tubes, such as described in Millhiser U.S. Patent 2,440,057 or in Drisch et al. U.S. Patent 2,511,699. Particularly useful in the coalescing step is a tube, of either circular or non-circular cross-section, that is twisted lengthwise about its axis, for example, approximately three turns per foot, the turns being in the same or in alternately opposite directions. These tubes of relatively small diameter and of substantial length confine the fragile filaments in their critical stage of formation so that no substantial tension is imposed on the filaments because the speed of the concurrent bath flow through the tube is maintained only silghtly below the speed of the filaments passing through the tube. It is thus possible to increase materially the rate of spinning without substantial sacrifice in continuity or in the desirable properties of the yarn produced. Another method which, if desired, may be used in handling the extruded shaped article involves the use of mechanical supports, such as endless belts submerged or partially submerged in the baths. Similarly, a series of advancing reels may be used. However, these mechanical aids are merely conveniences and are not essential. It is an important feature of this invention that the freshly extruded shaped article possesses sufficient strength to permit handling without the necessity for mechanical supports.

When the coalesced shaped articles are washed to remove the occluded salts and other soluble materials, the insoluble matrix material may remain as a minor part of the shaped article. This is not harmful to the desired product in any way, as it does not detract from the desirable physical properties. In fact, the presence of the matrix material is more often beneficial. If the matrix-forming material is ionic by nature, it may function as an anti-static agent in the finished product. This is an important advantage, because the great majority of the hydrophobic synthetic fibers and films are highly susceptible to static charge accumulation during weaving and subsequent processing, and means to eliminate this difficulty are constantly sought. In addition, the matrix material may be more readily dyeable than the coalesced polymer and consequently the shaped articles prepared according to this invention possess another advantage over those made by other methods. Also, the final articles usually have higher stick temperatures. The coalesced shaped articles can be drawn in the presence of the matrix material. During the drawing, the continuous matrix network may break up, but the matrix material can be allowed to remain in the drawn structure without adverse effect.

In addition to water, matrix-forming material and polymer, the dispersion used for producing the shaped article can contain dispersing agents, plasticizers, pigments, "nonsolvent" salts, dyes, clay, silica, alcohol, acetone, and similar materials. Alternatively, these materials may be incorporated in the coagulating bath, in the coalescing bath, or in separate baths or a combination thereof. These substances may or may not appear in the shaped articles such as filaments and films. If desired, the coagulated articles may be passed through a bath between the coagulating and coalescing media for washing, filling, plasticization and the like prior to coalescing.

After coalescing, the shaped article may be treated with a suitable finishing agent, if this appears desirable, to enhance its usefulness or to facilitate subsequent processing. For instance, it is desirable to treat yarn produced from polytetrafluoroethylene with a suitable size to facilitate weaving. Polyvinyl alcohol is preferred for this purpose. One method of application is to treat the yarn with a solution containing about 4 to 5% of this material at a temperature above 50° C., with other conditions adjusted so that the yarn is coated with 3 to 4% of polyvinyl alcohol, based on the weight of the dry yarn.

A particular advantage of the process of this invention is that polymers of high molecular weight, for example, of the order up to 1,000,000 or more, surprisingly are even more susceptible to use than those of lower molecular weight. Preparation of very high molecular weight polymers from monomers such as polyacrylonitrile can be achieved by minimizing the several factors which can be contributed to low molecular weight polymer. For example, the use of all glass apparatus to eliminate metallic impurities, the use of highly purified monomer, addition of the entire monomer charge at the start of the polymerization and rigid temperature control throughout the polymerization are examples of conditions which can be used to insure formation of very high molecular weight polymer.

The preparation of filaments from solutions of very high molecular weight polymers by prior art methods has not been practiced because solutions containing commercially useful concentrations of polymer have viscosities which are too high to be processed under reasonable conditions. The practical limits are usually set by the difficulty of filtering the polymer-containing compositions (melts, plasticized melts, solutions) rather than by difficulties with the extrusions through orifices. Present industrial spinning is confined substantially to compositions with viscosities below 5,000 poises at spinning temperatures. However, in the process of this invention the viscosity of the dispersions is independent of the molecular weight so that there is no upper limit to the molecular weight of the polymers which can be utilized.

The properties of products obtained from the higher molecular weight materials are superior to those formed from lower molecular weight polymers. Unexpectedly, films and filaments prepared in accordance with this invention are more flexible than those prepared by the ordinary solution processes well known to the art.

The shaped articles of this invention in the water gel state are more susceptible to plasticization and to dye take-up than similar articles prepared from organic solvent solutions of these polymers. The finished products possess the high strength, flexibility, and toughness required for fiber and film applications.

By this invention the difficulties of fabrication from solutions of high molecular weight polymers, such as balling up, high viscosities and chemical degradation, are avoided since the dispersions are fluid. Furthermore, the dispersions can be, and preferably are, quite concentrated with respect to the amount of polymer present. In addition, the process of this invention can be used successfully with polymers that have molecular weights so high that ordinary solution spinning techniques are inapplicable. A further advantage of the process is that isolation of polymer is not required. Finally, frequently the temperatures employed in the process of this invention are low, in the vicinity of room temperature, and if high temperatures are needed, only short exposure periods are required. As a result, most of the products are not discolored during formation and are essentially white.

Since organic vinyl type polymers of high qualtiy are usually best prepared in aqueous dispersion, fabrication processes operable directly on the dispersion without isolation and dissolving of the polymer are particularly attractive economically. In addition, the relatively low viscosity of high solids dispersions compared with high viscosity solutions, the cheapness and safety of water media, and the ability to handle difficultly soluble polymers of unusually good properties in aqueous dispersion, are distinct advantages.

Many other equivalent modifications will be obvious to those skilled in the art from a reading of the above description without a departure from the inventive concept.

What is claimed is:

1. A shaped structure having a self-supporting length of at least one foot in filament form, consisting essentially of (A) from about 60 to 90% by weight of water; (B) 0.1 to about 14% by weight of a water-soluble polymer in gelled form; and (C) at least 9.9% by weight of a water-insoluble synthetic organic polymer in particulate form, the combined weight of (B) and (C) being from about 10 to 40% by weight of the shaped structure.

2. The shaped structure of claim 1 wherein the particles of the said polymer have a size of about 0.005 to about 15 microns.

3. The shaped structure of claim 1 wherein the water-soluble polymer is present in amounts of from about 1% to about 10% based on the weight of (B) and (C) of the said shaped structure.

References Cited by the Examiner

UNITED STATES PATENTS

| | | | |
|---|---|---|---|
| 1,722,928 | 7/1929 | Lilienfeld | 106—128 |
| 2,275,991 | 3/1942 | Powers et al. | 18—54 |
| 2,509,057 | 5/1950 | Borchert et al. | 18—54 |
| 2,530,362 | 11/1950 | Morris | 18—54 |
| 2,600,681 | 6/1952 | Parke et al. | 18—57 |
| 2,682,519 | 6/1954 | Caldwell | 264—182 |
| 2,683,130 | 7/1954 | D'Alelio | 264—182 |
| 2,687,393 | 8/1954 | Trementozzi | 264—182 |
| 2,688,008 | 8/1954 | Chaney et al. | 264—182 |
| 2,697,023 | 12/1954 | Martin | 264—182 |
| 2,725,370 | 11/1955 | Caldwell | 264—182 |
| 2,772,444 | 12/1956 | Burrows et al. | 264—127 |

ALEXANDER H. BRODMERKEL, *Primary Examiner.*